United States Patent
Iida et al.

(10) Patent No.: US 11,524,630 B2
(45) Date of Patent: Dec. 13, 2022

(54) ELECTRONIC MIRROR SYSTEM FOR VEHICLE

(71) Applicant: Toyota Jidosha Kabushiki Kaisha, Toyota (JP)

(72) Inventors: Tomoaki Iida, Okazaki (JP); Yuki Takahashi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 17/068,125

(22) Filed: Oct. 12, 2020

(65) Prior Publication Data
US 2021/0206318 A1 Jul. 8, 2021

(30) Foreign Application Priority Data
Jan. 8, 2020 (JP) .............................. JP2020-001637

(51) Int. Cl.
| | |
|---|---|
| *G09G 5/00* | (2006.01) |
| *B60R 1/00* | (2022.01) |
| *H04N 5/247* | (2006.01) |
| *H04N 5/265* | (2006.01) |
| *H04N 5/272* | (2006.01) |

(Continued)

(52) U.S. Cl.
CPC ................ *B60R 1/00* (2013.01); *G06T 7/246* (2017.01); *G06T 7/50* (2017.01); *G06T 11/00* (2013.01); *G06V 20/588* (2022.01); *H04N 5/247* (2013.01); *H04N 5/265* (2013.01); *H04N 5/272* (2013.01); *B60R 2300/105* (2013.01); *B60R 2300/20* (2013.01); *B60R 2300/8066* (2013.01); *G06T 2207/30241* (2013.01); *G06T 2207/30256* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |

(Continued)

FOREIGN PATENT DOCUMENTS

| | | | |
|---|---|---|---|
| EP | 3292024 A1 | 3/2018 | |
| EP | 3305597 A1 | 4/2018 | |

(Continued)

*Primary Examiner* — Gordon G Liu
(74) *Attorney, Agent, or Firm* — Dinsmore & Shohl LLP

(57) ABSTRACT

A display control device displays, on an electronic inner mirror, a composite image composited by performing image processing on a rear image captured by a rear camera and rear lateral images captured by an outer camera unit such that the rear image and the rear lateral images become a continuous image. A subject vehicle virtual image superimposition display unit of the display control device generates a virtual image of a subject vehicle virtually showing a subject vehicle and displays the virtual image of the subject vehicle superimposed on the composite image. A subject vehicle travel trajectory superimposition display unit of the display control device generates a virtual image of travel trajectory, which extends from left and right rear wheels toward the rear of the vehicle in the composite image, and displays the virtual image of travel trajectory superimposed on the composite image.

8 Claims, 15 Drawing Sheets

(51) Int. Cl.
*G06T 7/50* (2017.01)
*G06T 7/246* (2017.01)
*G06T 11/00* (2006.01)
*G06V 20/56* (2022.01)

(56) References Cited

U.S. PATENT DOCUMENTS

| | | |
|---|---|---|
| 10,106,157 B2 | 10/2018 | Sawada et al. |
| 10,150,407 B2 | 12/2018 | Takahashi et al. |
| 10,696,297 B2 | 6/2020 | Nguyen Van et al. |
| 11,001,255 B2 | 5/2021 | Fukuman et al. |
| 11,110,937 B2 | 9/2021 | Kinoshita et al. |
| 2010/0238283 A1* | 9/2010 | Kim .................. G06T 7/73 348/135 |
| 2014/0085466 A1* | 3/2014 | Moriyama .......... G08G 1/165 348/148 |
| 2019/0026947 A1* | 1/2019 | Herman .................. B60R 1/00 |

FOREIGN PATENT DOCUMENTS

| | | |
|---|---|---|
| JP | 2006-051850 A | 2/2006 |
| JP | 2018-061253 A | 4/2018 |
| WO | 2016178190 A1 | 11/2016 |

\* cited by examiner

ELECTRONIC MIRROR SYSTEM FOR VEHICLE

CROSS-REFERENCE TO RELATED APPLICATION

This application claims priority to Japanese Patent Application No. 2020-001637 filed on Jan. 8, 2020, incorporated herein by reference in its entirety.

BACKGROUND

1. Technical Field

The present disclosure relates to an electronic mirror system for a vehicle.

2. Description of Related Art

WO 2016/178190 discloses an disclosure related to a vehicle surroundings monitoring device. The vehicle surroundings monitoring device displays a longitudinal guideline extending in a longitudinal direction of a vehicle and a lateral guideline extending from the longitudinal guideline in a vehicle width direction, which are superimposed on an image captured by an imaging device that is provided outside the vehicle and captures an image of side and rear of the vehicle. Accordingly, it is possible to easily grasp the distance perception around the vehicle when a driver sees the captured image as compared with a case where only one of the longitudinal guideline or the lateral guideline is displayed.

SUMMARY

In the configuration disclosed in WO 2016/178190, doors of the vehicle are shown in the image, thus it is possible to grasp a relative position on a road of a subject vehicle in the lateral direction by visually recognizing a gap between the door of the subject vehicle and a lane boundary line of the road shown in the image. However, the image captured by a rear imaging unit that captures an image of the rear of the vehicle does not include the subject vehicle. Furthermore, even when a composite image is obtained by integrally compositing the image captured by the rear imaging unit with images captured by a pair of left and right rear lateral imaging units that respectively capture images of the rear on left and right sides of the vehicle, the subject vehicle may not be included in the composite image in a case where image processing is performed so as to continuously connect those images. Therefore, it is difficult to grasp the relative position on the road of the subject vehicle in the lateral direction from these images. Accordingly, the related art described above needs to be improved in these aspects.

The present disclosure is intended to provide an electronic mirror system for a vehicle which allows the driver to easily grasp, from an image, the relative position of the subject vehicle in the lateral direction on a road in consideration of the shortcomings described above.

An electronic mirror system for a vehicle according to an aspect of the present disclosure includes a rear imaging unit configured to capture an image of a rear of a vehicle, a pair of a left and right rear lateral imaging units respectively configured to capture images of the rear on left and right sides of the vehicle, and an image processing unit. The image processing unit includes a subject vehicle superimposition display unit configured to display, on a display unit, a composite image, composited by performing image processing on a rear image captured by the rear imaging unit and rear lateral images captured by the rear lateral imaging units such that the rear image and the rear lateral images become a continuous image, and configured to generate a virtual image of a subject vehicle virtually showing the vehicle, and to displayed the virtual image of the subject vehicle superimposed on the composite image, the virtual image of the subject vehicle including a pair of left and right rear wheels of such a vehicle, and a subject vehicle travel trajectory superimposition display unit configured to generate a virtual image of travel trajectory virtually showing a travel trajectory of the vehicle and to display the virtual image of travel trajectory superimposed on the composite image. The travel trajectory extends from the left and right rear wheels toward the rear of the vehicle in the composite image With the above aspect, the image processing unit is configured to display, on the display unit, the composite image, composited by performing image processing on the rear image captured by the rear imaging unit and the rear lateral images captured by the rear lateral imaging units such that the rear image and the rear lateral images become a continuous image. The subject vehicle virtual image superimposition display unit configured to generate the virtual image of the subject vehicle virtually showing the subject vehicle and including the left and right rear wheels of the vehicle to display the virtual image of the subject vehicle superimposed on the composite image. Further, the subject vehicle travel trajectory superimposition display unit of the image processing unit is configured to generate a virtual image of travel trajectory virtually showing the travel trajectory of the vehicle and extending from the left and right rear wheels toward the rear of the vehicle in the composite image to display the virtual image of travel trajectory superimposed on the composite image. Therefore, the relative position on the road of the subject vehicle in the lateral direction can be easily grasped from the position of the virtual image of travel trajectory with respect to the road shown in the composite image.

The electronic mirror system according to the above aspect has an advantageous effect in that it is possible to easily grasp, from the image, the relative position on the road of the subject vehicle in the lateral direction.

In the above aspect, the image processing unit is configured to detect a lane boundary line appearing in at least one of the rear image, the rear lateral images, and the composite image, and the subject vehicle travel trajectory superimposition display unit is configured to calculate a distance from positions corresponding to the left and right rear wheels in the composite image to the lane boundary line appearing in at least one of the rear image, the rear lateral images and the composite image, and configured to generate the virtual image of travel trajectory along the lane boundary line and apart from the lane boundary line by the calculated distance.

With the above aspect, the image processing unit is configured to detect the lane boundary line appearing in the composite image. The subject vehicle travel trajectory superimposition display unit is configured to calculate the distance from the positions corresponding to the left and right rear wheels in the composite image to the lane boundary line, and configured to generate the virtual image of travel trajectory along the lane boundary line and apart from the lane boundary line by the calculated distance. Therefore, the virtual image of travel trajectory can be generated even when the vehicle is not traveling after the electronic mirror system for the vehicle is activated, thus it is possible to easily grasp the relative position on the road of the subject vehicle in the lateral direction even before the vehicle travels.

The electronic mirror system according to the above aspect has an advantageous effect in that it is possible to easily grasp, from the image, the relative position on the traveling lane of the subject vehicle in the lateral direction even before the vehicle travels.

Herein, it is assumed that the term "lane boundary line" may include, for example, a center line, a road boundary line, a median strip, a road stud and a marker buried in the road surface, and a road marking, on the road on which the subject vehicle travels.

In the above aspect, the subject vehicle travel trajectory superimposition display unit is configured to generate the virtual image of travel trajectory such that a display range of the virtual image of travel trajectory in an extending direction in the composite image is the same as a display range of the lane boundary line in the extending direction in the composite image.

With the above aspect, the subject vehicle travel trajectory superimposition display unit is configured to generate the virtual image of travel trajectory such that the display range of the virtual image of travel trajectory in the extending direction in the composite image is the same as the display range of the lane boundary line in the extending direction in the composite image. Therefore, it is possible to reduce a feeling of discomfort that the driver may feel when visually recognizing the composite image from the virtual image of travel trajectory which is displayed for a longer time in a case where the display range of the extending direction on the lane boundary line in the composite image is relatively smaller, e.g., after the vehicle passes through a top of a slope, as compared with a case where the vehicle travels on flat ground.

The electronic mirror system according to the above aspect has an advantageous effect in that it is possible to improve visual recognition.

With the above aspect, the image processing unit is configured to acquire steering angle information of a steering wheel of the vehicle, and the subject vehicle virtual image superimposition display unit is configured to curve, according to the steering angle information, the virtual image of travel trajectory about the positions corresponding to the left and right rear wheels in the composite image in a width direction of the vehicle.

In the above aspect, the image processing unit is configured to acquire the steering angle information of the steering wheel of the vehicle, and the subject vehicle virtual image superimposition display unit is configured to curve, according to the steering angle information, the virtual image of travel trajectory about the positions corresponding to the left and right rear wheels in the composite image in the width direction of the vehicle, thus the virtual image of travel trajectory closer to the actual traveling state can be superimposed on the composite image.

The electronic mirror system according to the above aspect has an advantageous effect in that it is possible to reduce a feeling of discomfort that the driver may feel while visually recognizing the composite image.

In the above aspect, the image processing unit is configured to extract a feature point from a range in a vicinity of the rear of the vehicle at the positions corresponding to the left and right rear wheels in at least one of the rear image, the rear lateral images, and the composite image, and the subject vehicle travel trajectory superimposition display unit is configured to generate the virtual image of travel trajectory based on a movement trajectory of the feature point.

With the above aspect, the image processing unit is configured to generate the virtual image of travel trajectory based on the movement trajectory of the feature point extracted from the range in the vicinity of the rear of the vehicle at the positions corresponding to the left and right rear wheels in the composite image, thus it is possible to display the travel trajectory along the actual travel trajectory. Therefore, it is possible to display the travel trajectory virtual image superimposed on the composite image even in a case where the lane boundary line cannot be detected.

The electronic mirror system according to the above aspect of the present disclosure has an advantageous effect in that it is possible to easily grasp the relative position on the traveling lane of the subject vehicle in the lateral direction, even when it is difficult to detect the lane boundary line.

In the above aspect, the image processing unit is configured to expand a range from which the feature point is extracted in the composite image in a case where the feature point is not extractable from the range in the vicinity of the rear of the vehicle at the positions corresponding to the left and right rear wheels in at least one of the rear image, the rear lateral images and the composite image.

With the above aspect, the image processing unit is configured to expand the range from which the feature point is extracted in the composite image in a case where the feature point cannot be extracted from the range in the vicinity of the rear of the vehicle at the positions corresponding to the left and right rear wheels in the composite image, thus it is possible to generate the virtual image of travel trajectory even when it is difficult to extract the feature point.

The electronic mirror system according to the above aspect has an advantageous effect in that it is possible to display the travel trajectory virtual image of travel trajectory superimposed on the composite image under various situations.

In the above aspect, the subject vehicle travel trajectory superimposition display unit is configured to change, in a case where the composite image shows a vehicle behind the vehicle, a length of the virtual image of travel trajectory in the extending direction such that the virtual image of travel trajectory does not overlap with the vehicle behind the vehicle.

With the above aspect, the subject vehicle travel trajectory superimposition display unit is configured to change the length of the virtual image of travel trajectory in the extending direction such that the virtual image of travel trajectory does not overlap with the vehicle behind the vehicle shown in the composite image, thus it is possible to reduce a feeling of discomfort that the driver may feel while visually recognizing the composite image when the virtual image of travel trajectory is superimposed on the vehicle behind the vehicle.

In the above aspect, the subject vehicle travel trajectory superimposition display unit is configured to change a display of the virtual image of travel trajectory in a case where the composite image shows a vehicle behind the vehicle and a distance from the vehicle to the vehicle behind the vehicle is equal to or less than a predetermined distance.

With the above aspect, the subject vehicle travel trajectory superimposition display unit is configured to change the display of the virtual image of travel trajectory in a case where the distance from the subject vehicle to the vehicle behind the vehicle shown in the composite image is equal to or less than the predetermined distance, as compared with other cases, thus it is possible to easily grasp the distance perception between the subject vehicle and the vehicle behind the vehicle when visually recognizing the composite image.

The electronic mirror system according to the above aspect has an advantageous effect in that it is possible to easily grasp the positional relationship between the subject vehicle and the vehicle behind the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

One embodiment of an electronic mirror system for a vehicle 10 according to the present disclosure will be described hereinbelow with reference to FIGS. 1 to 8.

Overall Configuration

Figure 1:
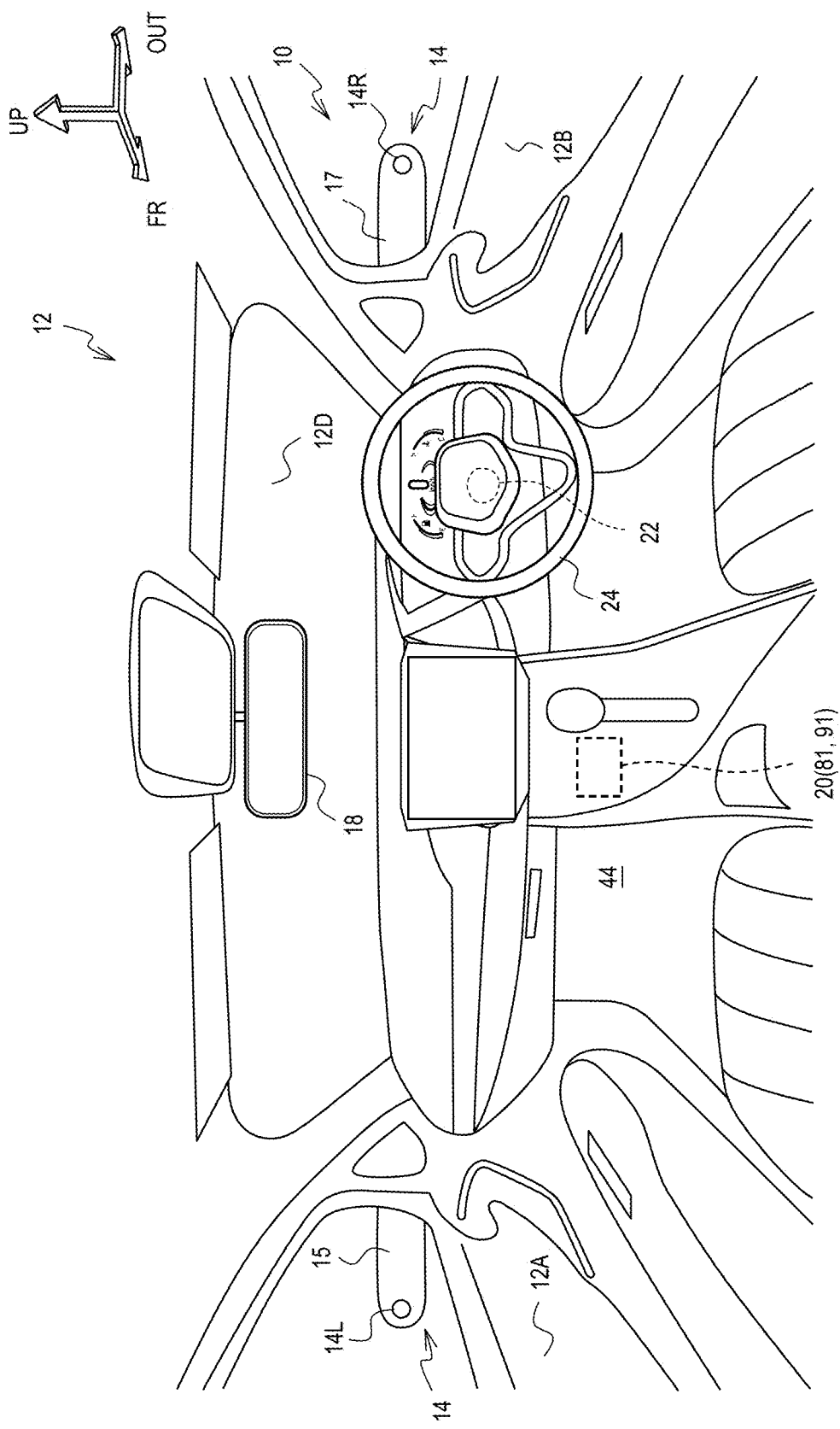
FIG. 1 is a schematic perspective view showing a situation in which a vehicle compartment of a vehicle having an electronic mirror system for a vehicle according to a first embodiment is viewed facing toward a front of the vehicle.

As shown in FIG. 1, the electronic mirror system for the vehicle 10 includes an outer camera unit 14 as the rear lateral imaging unit, mounted on a vehicle (hereinafter, sometimes referred to as a "subject vehicle") 12, a rear camera 16 (see FIG. 2) as the rear imaging unit, an electronic inner mirror 18 as the display unit, a display control device 20 as the image processing unit, and a steering angle sensor 22.

A base portion of a camera support 15 having a substantially rectangular parallelepiped shape and an arched tip portion is attached at a vehicle front end portion of a middle portion of a vehicle in a vertical direction of a left side door 12A (front side door) of the vehicle 12, such that the tip portion of the camera support 15 projects to the outside of the vehicle. A left rear camera 14L forming a part of the outer camera unit 14 is attached near the tip portion of the camera support 15. The left rear camera 14L has an imaging optical axis (a lens) directed toward the left rear of the vehicle so as to partially capture image of the left rear of the vehicle while partially capturing image of the left of the vehicle. The camera support 15 is rotatable around a vertical axis of the vehicle, and is rotatable, by driving force by an actuator, (not shown) to a storage position at which a longitudinal direction of the camera support 15 is substantially along an outer surface of the vehicle, or to a return position at which the left rear camera 14L captures image of the left rear of the vehicle. Specific configuration and operation of the left rear camera 14L will be described below.

Further, a base portion of a camera support 17 is attached at a vehicle front end portion of a middle portion of a vehicle in a vertical direction of a right side door 12B (front side door, not shown) of the vehicle 12, which has a shape that is symmetrical with the camera support 15. A right rear camera 14R forming another part of the outer camera unit 14 is attached near the tip portion of the camera support 17. The right rear camera 14R has an imaging optical axis (a lens) directed toward the right rear of the vehicle so as to partially capture image of the right rear of the vehicle while partially capturing image of the right side of the vehicle. The camera support 17 is also rotatable around the vertical axis of the vehicle, and is rotatable, by driving force by an actuator (not shown), to a storage position at which a longitudinal direction of the camera support 17 is substantially along the outer surface of the vehicle, or to a return position at which the right rear camera 14R captures image of the right rear of the vehicle. Specific configuration and operation of the right rear camera 14R will be described below.

Figure 2:
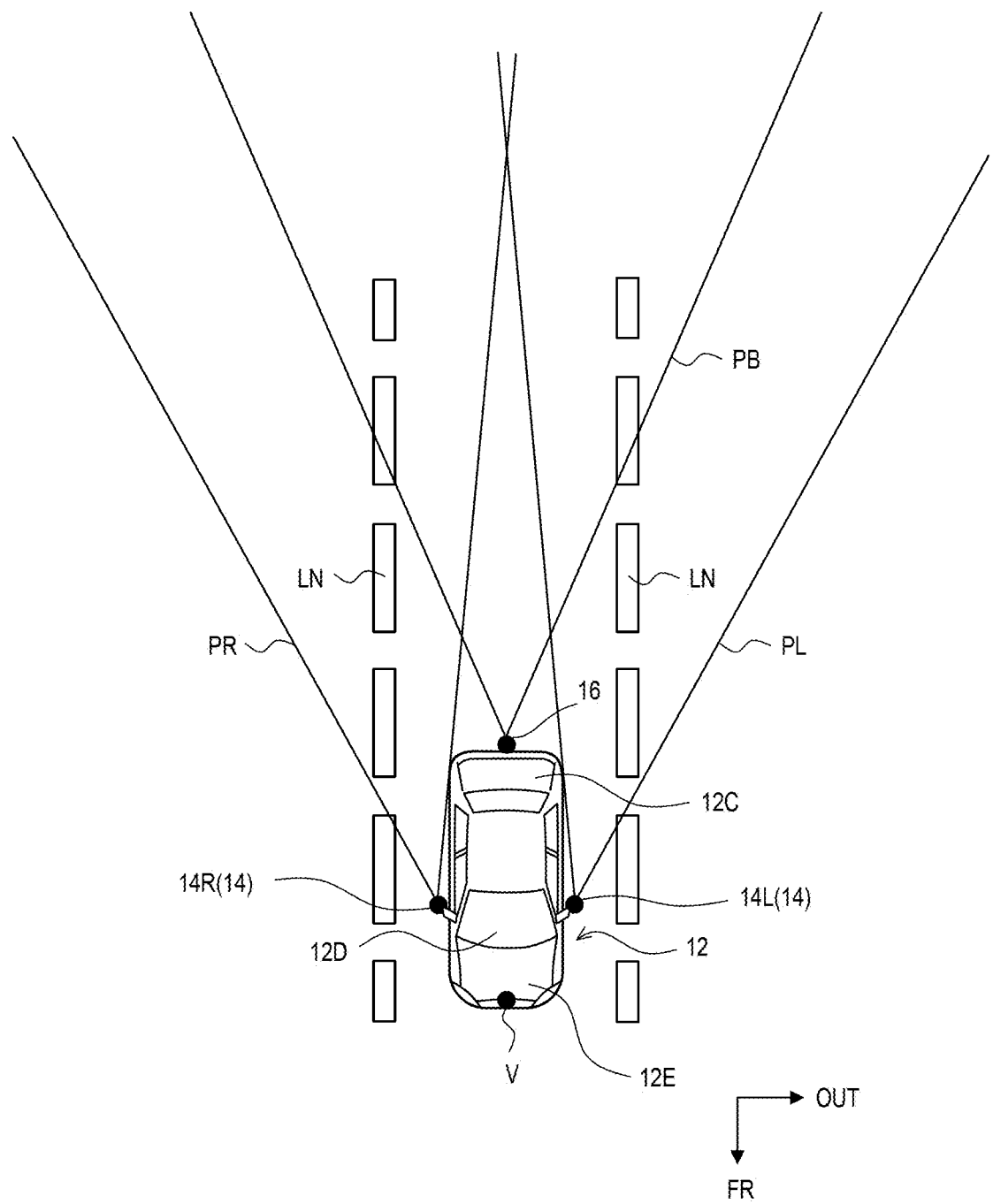
FIG. 2 is a plan view schematically showing an imaging range of the vehicle having the electronic mirror system for the vehicle according to the first embodiment.

Further, as shown in FIG. 2, the rear camera 16 is attached to a trunk lid 12C of the vehicle 12. The rear camera 16 has an imaging optical axis (a lens) directed toward the rear of the vehicle and captures image of the rear of the vehicle 12. Specific configuration and operation of the rear camera 16 will be described below.

As shown in FIG. 1, the electronic inner mirror 18 is provided on a vehicle upper side of a front windshield glass 12D and is provided substantially at the center in the vehicle width direction. Specific configuration and operation of the electronic inner mirror 18 will be described below.

The display control device 20 is mounted in the vehicle compartment and is communicably connected to the outer camera unit 14, the rear camera 16, the electronic inner mirror 18, and the steering angle sensor 22. Specific configuration and operation of the display control device 20 will be described below.

The steering angle sensor 22 is provided in the vicinity of a steering wheel 24 and is connected to the display control device 20 so as to be able to communicate therewith. Specific configuration and operation of the steering angle sensor 22 will be described below.

Hardware Configuration

Figure 7:
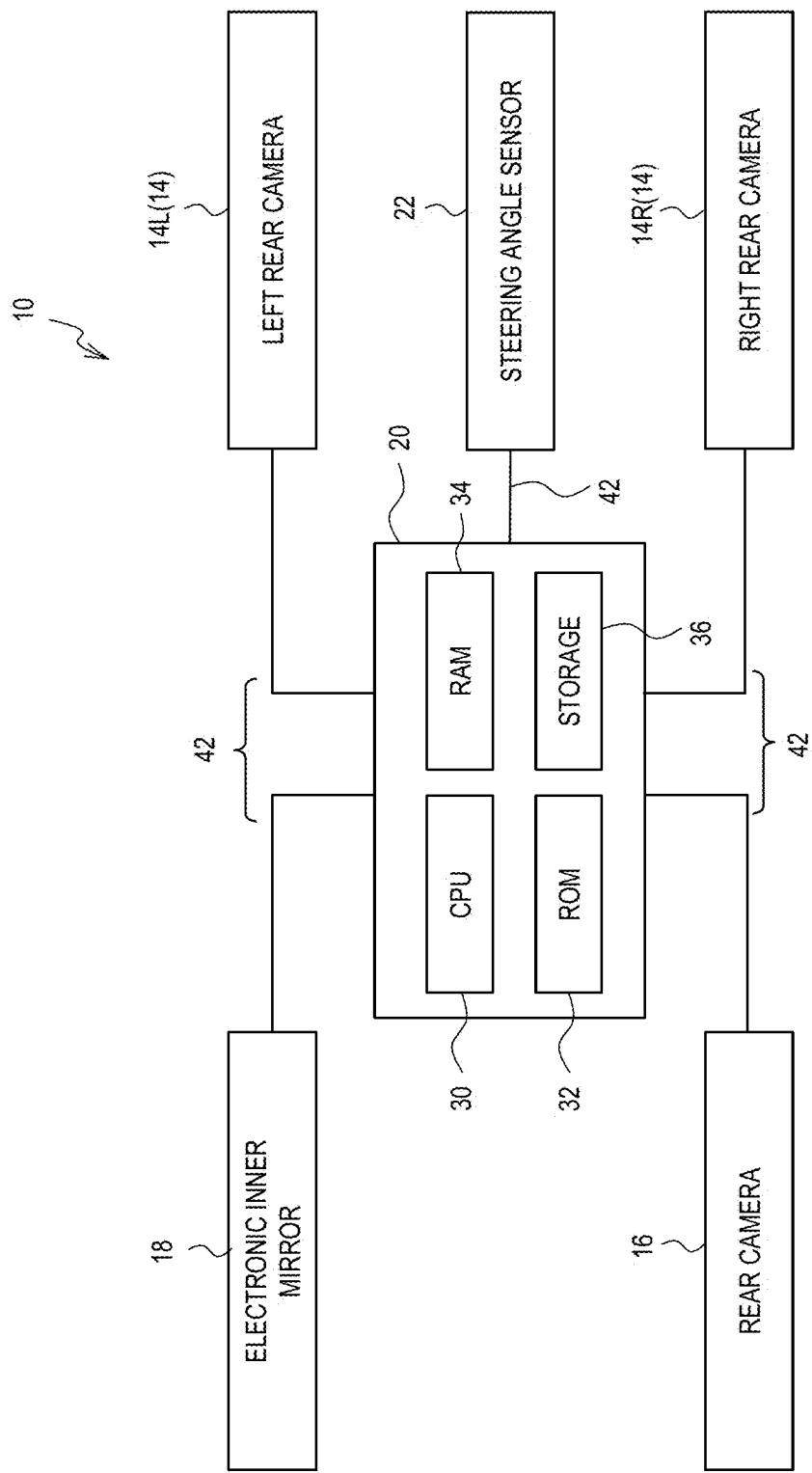
FIG. 7 is a block diagram showing a hardware configuration of the electronic mirror system for the vehicle according to the first embodiment.

FIG. 7 is a block diagram showing a hardware configuration of the electronic mirror system for the vehicle 10.

As shown in FIG. 7, the electronic mirror system for the vehicle 10 includes a central processing unit (CPU) 30, a read-only memory (ROM) 32, a random access memory (RAM) 34, and a storage 36, which are installed in the display control device 20, as well as the left rear camera 14L, the right rear camera 14R, the rear camera 16, the electronic inner mirror 18 and the steering angle sensor 22. The components are connected via a bus 42 so as to communicate with each other.

The CPU 30 is a central processing unit that executes various programs and controls each unit. That is, the CPU 30 reads a program from the ROM 32 or the storage 36 and executes the program using the RAM 34 as a work area. The CPU 30 controls the components described above and performs various arithmetic processes according to programs recorded in the ROM 32 or the storage 36. In the present embodiment, the ROM 32 or the storage 36 stores an image display program for displaying the image on the electronic inner mirror 18.

The ROM 32 stores various programs and various pieces of data. The RAM 34 temporarily stores a program or data as a work area. The storage 36 is configured by a hard disk drive (HDD) or a solid state drive (SSD), which stores various programs including an operating system and various pieces of data.

The left rear camera 14L does not have a mechanism that changes a direction of the imaging optical axis, according to one example, and the lens has a fixed focal point and an angle of view that is relatively wide. Therefore, the left rear camera 14L, on the left rear of the vehicle 12, has an imaging range PL that has a relatively wide angle and is constant, as shown in FIG. 2, in a case where the camera support 15 is positioned at the return position. In particular, the imaging range PL of the left rear camera 14L has a shape having a width increasing in the vehicle width direction toward a vehicle rear, with an outer side of the camera support 15 in the vehicle width direction as an apex, in which the left rear camera 14L is attached to the camera support 15 in plan view of the vehicle.

The right rear camera 14R does not have a mechanism that changes a direction of the imaging optical axis, according to one example, and the lens has a fixed focal point and an angle of view that is relatively wide, similar to the left rear camera 14L. Therefore, the right rear camera 14R, on the right rear of the vehicle 12, has an imaging range PR that has a relatively wide angle and is constant in a case where the camera support 17 is positioned at the return position. In particular, the imaging range PR of the right rear camera 14R has a shape having a width increasing in the vehicle width direction toward the vehicle rear, with an outer side of the camera support 17 in the vehicle width direction as an apex, in which the right rear camera 14R is attached to the camera support 17 in plan view of the vehicle.

The rear camera 16 does not have a mechanism that changes a direction of the imaging optical axis, according to one example, and the lens has a fixed focal point and an angle of view that is relatively wide. Therefore, the rear camera 16 captures an imaging range PB at the rear of the vehicle 12, which has a relatively wide angle and is constant. In particular, the imaging range PB of the rear camera 16 has a shape having a width increasing in the vehicle width direction toward the vehicle rear, with a substantial center in the vehicle width direction and a vehicle upper side of the trunk lid 12C as apexes, in plan view of the vehicle.

As shown in FIG. 1, the electronic inner mirror 18 is configured by a liquid crystal panel, as one example, and can display the image toward the inside of a vehicle compartment 44. A composite image (see FIG. 3) obtained by performing the image processing on the images captured by the rear camera 16 (see FIG. 2), the left rear camera 14L and the right rear camera 14R in the display control device 20 so as to compose those images such that the rear image and the rear lateral images become a continuous image, is displayed on the electronic inner mirror 18. In other words, the electronic inner mirror 18 functions as a substitute for an inner mirror and a side mirror. The occupant visually recognizes the image displayed on the electronic inner mirror 18 to check the surroundings of the rear of the vehicle 12.

The steering angle sensor 22 is a sensor that detects the steering angle of the steering wheel 24, and outputs, to the display control device 20, information (a signal) according to the steering angle of the steering wheel 24.

Functional Configuration

When executing the image display program described above, the electronic mirror system for the vehicle 10 implements various functions using the hardware resources described above. A functional configuration implemented by the electronic mirror system for the vehicle 10 will be described.

Figure 8:
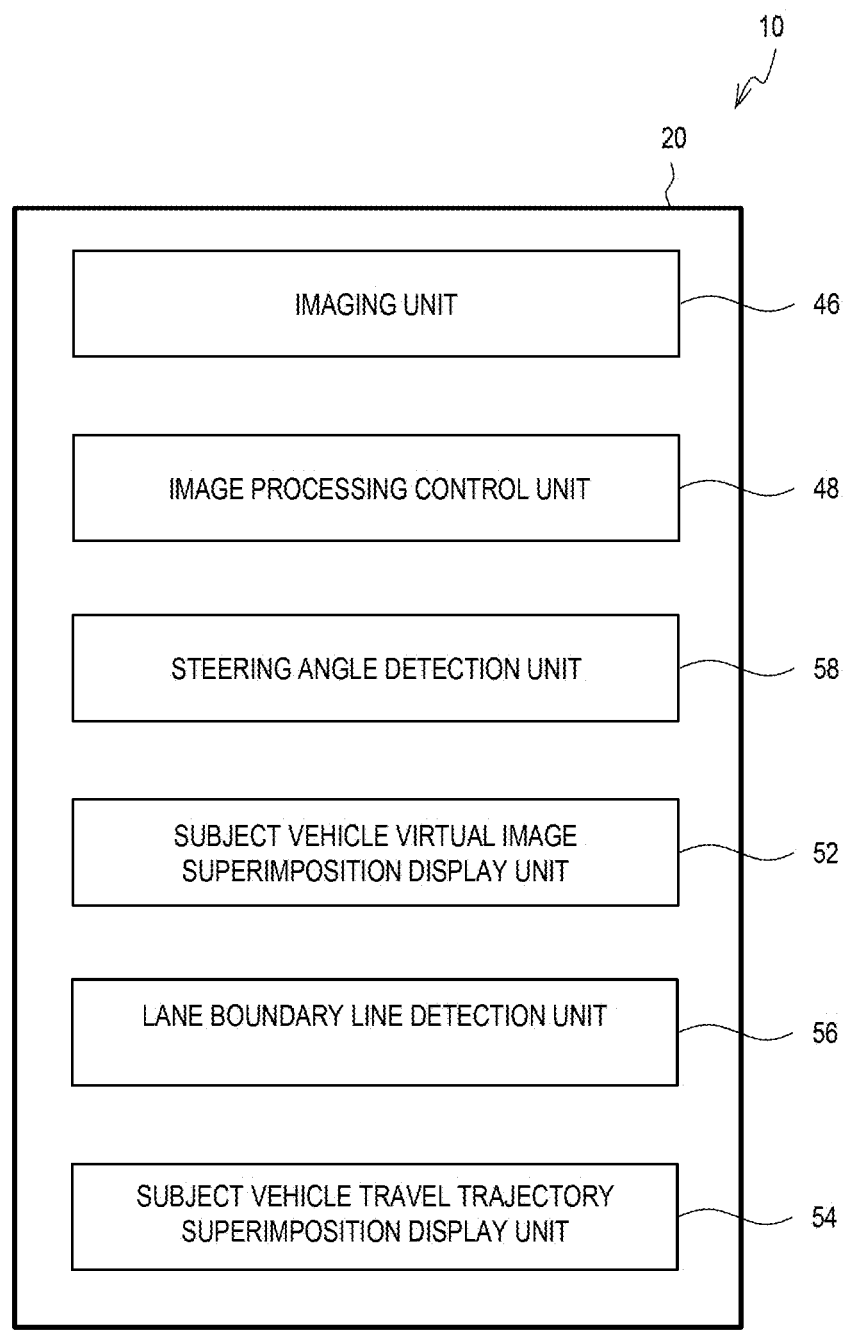
FIG. 8 is a block diagram showing a functional configuration of the electronic mirror system for the vehicle according to the first embodiment.

FIG. 8 is a block diagram showing an example of a functional configuration of the electronic mirror system for the vehicle 10.

As shown in FIG. 8, the electronic mirror system for the vehicle 10 has, as a functional configuration, an imaging unit 46, an image processing control unit 48, a virtual image of a subject vehicle virtual image superimposition display unit 52, a subject vehicle travel trajectory superimposition display unit 54, a lane boundary line detection unit 56, and a steering angle detection unit 58. Each functional configuration is implemented by the CPU 30 of the display control device 20 reading and executing the image display program stored in the ROM 32 or the storage 36 (see FIG. 7).

The imaging unit 46 captures a video of a part of the periphery of the vehicle 12 with the outer camera unit 14 and the rear camera 16. In particular, the rear camera 16 captures a rear image of the vehicle 12, and the outer camera unit 14 captures images of left and right rear sides of the vehicle 12 in the vehicle longitudinal direction. The imaging unit 46 outputs these captured images to the image processing control unit 48.

The steering angle detection unit 58 acquires steering angle information of the steering wheel 24 of the subject vehicle 12 from the steering angle sensor 22, and outputs the steering angle information to the image processing control unit 48.

The image processing control unit 48 outputs, to the electronic inner mirror 18, the image obtained by performing the image processing on the image captured by the imaging unit 46. The image processing control unit 48 performs the image processing for compositing the images captured by the left rear camera 14L with the right rear camera 14R with the image captured by the rear camera 16 respectively on both sides of the referring to rear camera, generates the composite image (see FIG. 3) subjected to the image processing as an image looking down diagonally from a virtual viewpoint V (see FIG. 2) set on the vehicle upper side of a hood 12E of the subject vehicle 12 toward a vehicle rear side and a vehicle lower side, and displays the composite image on the electronic inner mirror 18.

The lane boundary line detection unit 56 detects a lane boundary line LN in the composite image by performing image analysis on at least one of the rear image, the rear lateral images, and the composite image. Further, the lane boundary line detection unit 56 mainly detects, in the composite image, the lane boundary line LN that divides a traveling lane of the road on which the subject vehicle 12 is located from other lanes or shoulders.

Figure 3:
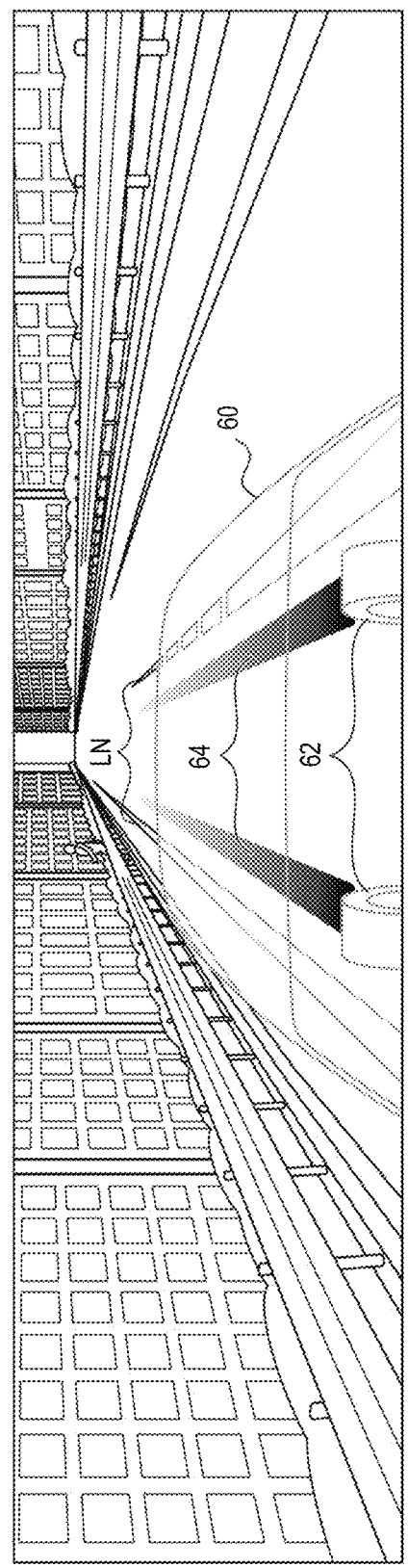
FIG. 3 is a schematic diagram showing an exemplified display of a composite image of the electronic mirror system for the vehicle according to the first embodiment.

As shown in FIG. 3, the virtual image of the subject vehicle virtual image superimposition display unit 52 generates a virtual image of a subject vehicle 60, which is a virtual image simulating a partial appearance of the vehicle 12 as viewed from the virtual viewpoint V toward the vehicle rear side and the vehicle rear lower side (in particular, a range from the vehicle upper side of the front windshield glass 12D to a roof panel). The virtual image of the subject vehicle 60 is displayed including left and right rear wheels 62 of the vehicle 12 as viewed from the virtual viewpoint V toward the vehicle rear side and the vehicle rear side, and is also superimposed on an area in which the vehicle 12 is located in the composite image. Further, the virtual image of the subject vehicle 60 is a semi-transparent image, such that the part of the composite image on which the virtual image of the subject vehicle 60 is superimposed can be visually recognized.

Figure 4:
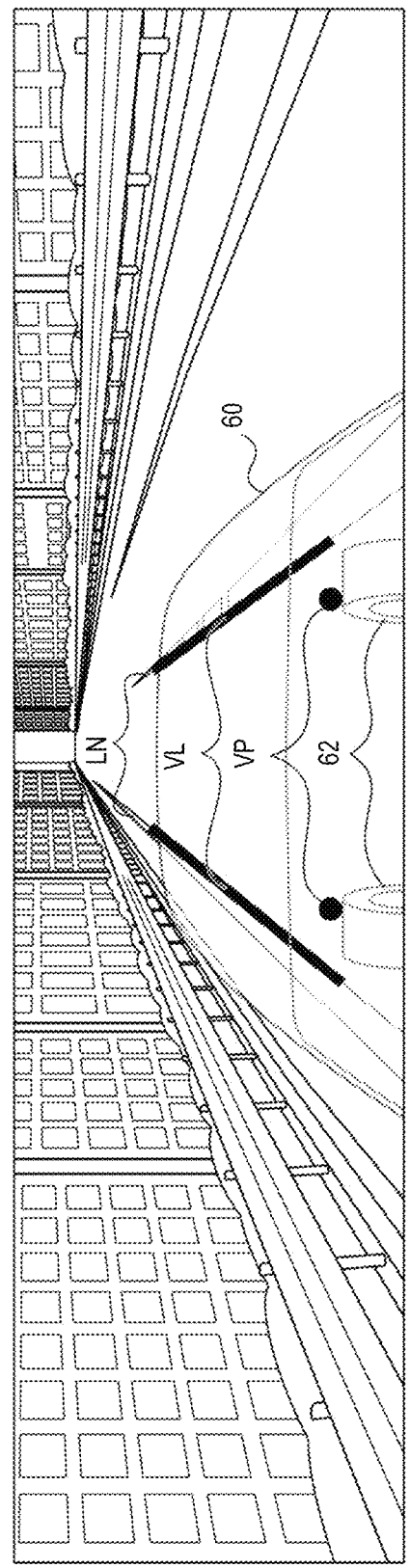
FIG. 4 is a schematic diagram schematically showing image processing of the electronic mirror system for the vehicle according to the first embodiment.

Further, the subject vehicle travel trajectory superimposition display unit 54 generates a first virtual image of travel trajectory 64 virtually showing travel trajectory of the vehicle, which respectively extend from the left and right rear wheels 62 of the virtual image of the subject vehicle 60 toward the rear of the vehicle 12 in the composite image, to display the first virtual image of travel trajectory 64 superimposed on the composite image. In particular, the subject vehicle travel trajectory superimposition display unit 54 generates a pair of virtual points VP on the composite image at the vehicle rear side and a lower side of the composite image corresponding to the left and right rear wheels 62 in the virtual image of the subject vehicle 60, as shown in FIG. 4. In other words, the positions corresponding to the left and right rear wheels in the composite image correspond to the virtual points VP. Coordinate positions of the virtual points VP on the composite image are fixed. Further, a pair of virtual line VL is generated according to the lane boundary line LN, detected by the lane boundary line detection unit 56, that divide in the composite image a traveling lane of the road on which the subject vehicle 12 is located from other lanes or shoulders. A distance in the vehicle width direction from the virtual point VP to the virtual line VL adjacent to the virtual point VP is calculated so as to generate the first virtual image of travel trajectory 64 parallel to the lane boundary line LN at such a distance with the virtual point VP as a starting point (see FIG. 3). In other words, a first virtual image of travel trajectory 64 is generated which is parallel to the lane boundary line LN toward the vehicle rear with the virtual point VP as the starting point on the composite image. Moreover, the virtual point VP and the virtual line VL in FIG. 4 are shown for better understanding but not displayed in the actual composite image.

Figure 5:
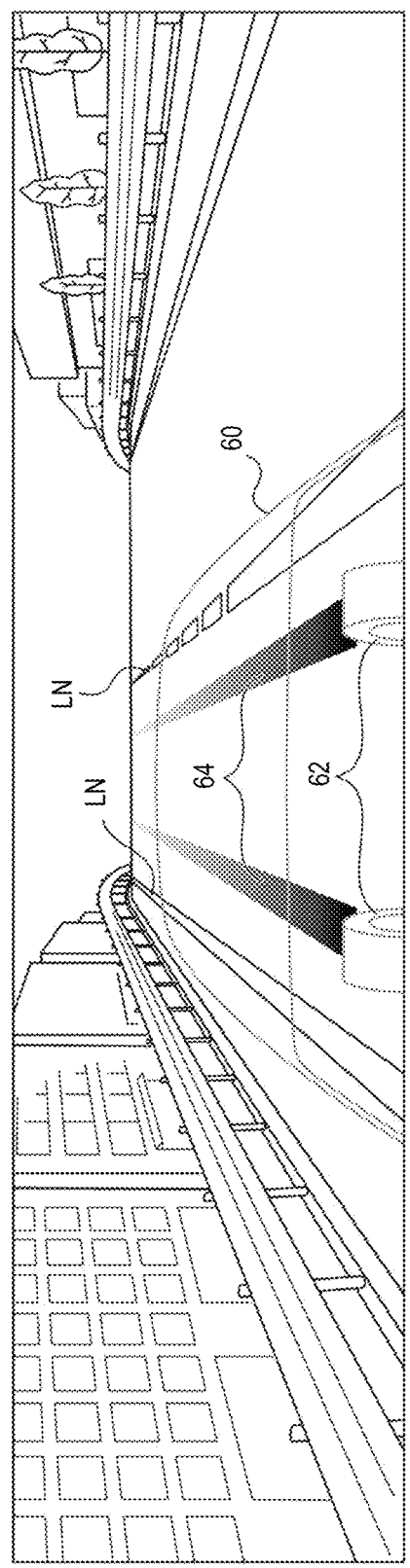
FIG. 5 is a schematic diagram showing an exemplified composite image in a case where the vehicle having the electronic mirror system for the vehicle according to the first embodiment travels on a slope.

As shown in FIG. 3, the subject vehicle travel trajectory superimposition display unit 54 superimposes the first virtual image of travel trajectory 64 within a range (hereinafter, simply referred to as a "trajectory display range") corresponding to a position that is toward the vehicle rear by a predetermined distance (for example, about 10 m) from the rear end of the vehicle 12. In addition, the subject vehicle travel trajectory superimposition display unit 54 shows perspective by, for example, increasing transparency of the first virtual image of travel trajectory 64 as the object image moves away from the subject vehicle 12. Further, the subject vehicle travel trajectory superimposition display unit 54 changes a length of the first virtual image of travel trajectory 64 in the extending direction so as to correspond to the display range in the extending direction of the lane boundary line LN in the composite image, in a case where the lane boundary line LN detected by the lane boundary line detection unit 56 is shorter than the trajectory display range in the vehicle longitudinal direction, for example, after the vehicle passes through a top of a slope, as shown in FIG. 5.

Figure 6:
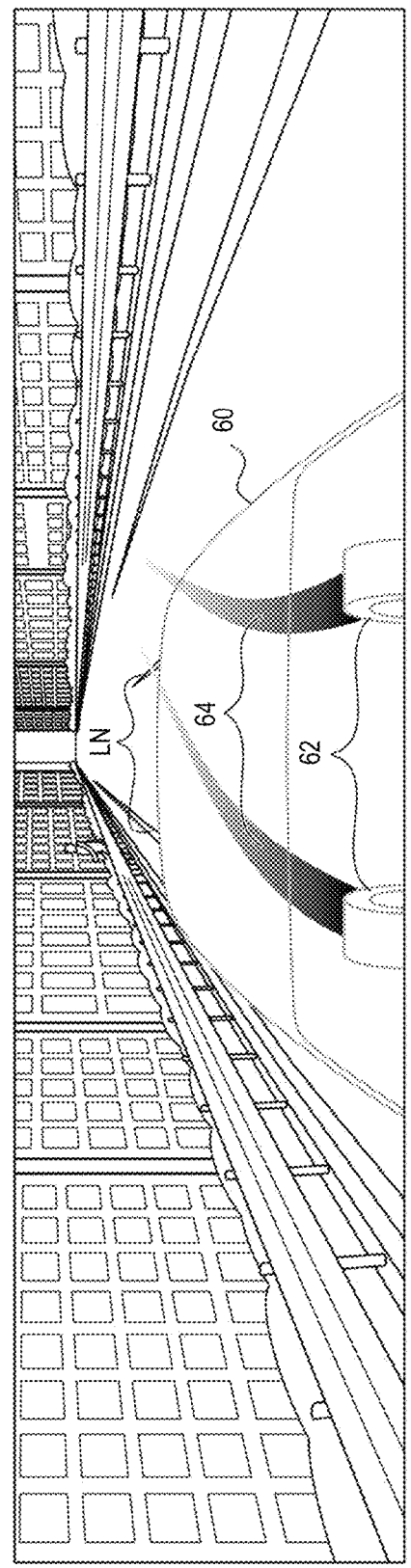
FIG. 6 is a schematic diagram showing an example of the composite image when the vehicle having the electronic mirror system for the vehicle according to the first embodiment steers a steering wheel to the left or right.

Further, the subject vehicle travel trajectory superimposition display unit 54 acquires the steering angle information of the steering wheel 24 from the steering angle detection unit 58, and curves the first virtual image of travel trajectory 64 in the composite image in the vehicle width direction around the virtual point VP (see FIG. 4) according to the steering angle information, as shown in FIG. 6.

Operation and Effect of First Embodiment

The operation and effect of the first embodiment will be described hereinbelow.

In the present embodiment, as shown in FIG. 8, the display control device 20 displays, on the electronic inner mirror 18, the composite image obtained by performing the image processing on the rear image captured by the rear camera 16 and the rear lateral images captured by the outer camera unit 14 so as to composite those images such that the rear image and the rear lateral images become a continuous image. The virtual image of the subject vehicle virtual image superimposition display unit 52 of the display control device 20 generates the virtual image of the subject vehicle 60 virtually showing the subject vehicle 12 including the left and right rear wheels 62 of the vehicle 12 so as to display the virtual image of the subject vehicle 60 superimposed on the composite image, as shown in FIG. 3. Further, the subject vehicle travel trajectory superimposition display unit 54 of the display control device 20 generates the first virtual image of travel trajectory 64 virtually showing the travel trajectory, which extends from the left and right rear wheels 62 toward the rear of the vehicle 12 in the composite image, so as to display the first virtual image of travel trajectory 64 superimposed on the composite image. Therefore, a relative position of the first virtual image of travel trajectory 64 in the lateral direction with respect to the road shown in the composite image can be easily grasped. Consequently, it is possible to easily grasp, from these images, the relative position on the road of the subject vehicle 12 in the lateral direction.

Further, the display control device 20 detects the lane boundary line LN appearing in the composite image. The subject vehicle travel trajectory superimposition display unit 54 calculates the distance from the positions corresponding to the left and right rear wheels 62 in the composite image to the lane boundary line LN, and generates the first virtual image of travel trajectory 64 along the lane boundary line LN and apart from the lane boundary line LN by the calculated distance. Therefore, the first virtual image of travel trajectory 64 can be generated even when the vehicle 12 is not traveling after the electronic mirror system for the vehicle 10 is activated, thus it is possible to easily grasp the relative position on the road of the subject vehicle 12 in the lateral direction even before the vehicle 12 travels. Consequently, it is possible to easily grasp, from the image, the relative position on the traveling lane of the subject vehicle 12 in the lateral direction even before the vehicle 12 travels.

Further, the first virtual image of travel trajectory 64 is generated parallel to the lane boundary line LN toward the vehicle rear with the virtual point VP as the starting point on the virtual image, thus image generation processing can be performed with a smaller load as compared with a case where the actual travel trajectory is calculated and displayed. Therefore, the load on the display control device 20 can be reduced.

Additionally, the subject vehicle travel trajectory superimposition display unit 54 generates the composite image such that the display range of the first virtual image of travel trajectory 64 in the extending direction in the composite image is the same as the display range of the lane boundary line LN in the extending direction in the composite image. Therefore, as shown in FIG. 5, it is possible to reduce a feeling of discomfort that the driver may feel while visually recognizing the composite image from the first virtual image of travel trajectory 64 which is displayed for a longer time in a case where the display range of the extending direction on the lane boundary line LN in the composite image is relatively smaller, e.g., after the vehicle passes through a top of a slope, as compared with a case where the vehicle travels on flat ground. As such, visibility can be improved.

Furthermore, the display control device 20 acquires the steering angle information of the steering wheel 24 of the vehicle 12. The subject vehicle virtual image superimposition display unit 52 curves, according to the steering angle information, the first virtual image of travel trajectory 64 about the positions corresponding to the left and right rear wheels 62 in the composite image, thus the first virtual image of travel trajectory 64 closer to the actual traveling state can be superimposed on the composite image, as shown in FIG. 6. Consequently, it is possible to reduce a feeling of discomfort that the driver may feel from the composite image.

Second Embodiment

An electronic mirror system for a vehicle according to a second embodiment of the present disclosure will be described hereinbelow with reference to FIGS. 9 to 13. The same components as those in the first embodiment described above are denoted by the same reference signs and the description thereof will be omitted.

An electronic mirror system for a vehicle 80 according to the second embodiment has the same basic configuration as that of the first embodiment, while a display control device 81 generates the first virtual image of travel trajectory 64 by extracting a feature point from a range of the left and right rear wheels 62 within the vicinity of the rear of the vehicle.

That is, the electronic mirror system for the vehicle 80 includes the rear camera 16 (see FIG. 2), the outer camera unit 14, the electronic inner mirror 18, and the display control device 81 (see FIG. 1). The electronic mirror system for the vehicle 80 implements various functions using the hardware resources described above. A functional configuration implemented by the electronic mirror system for the vehicle 80 will be described.

Figure 13:
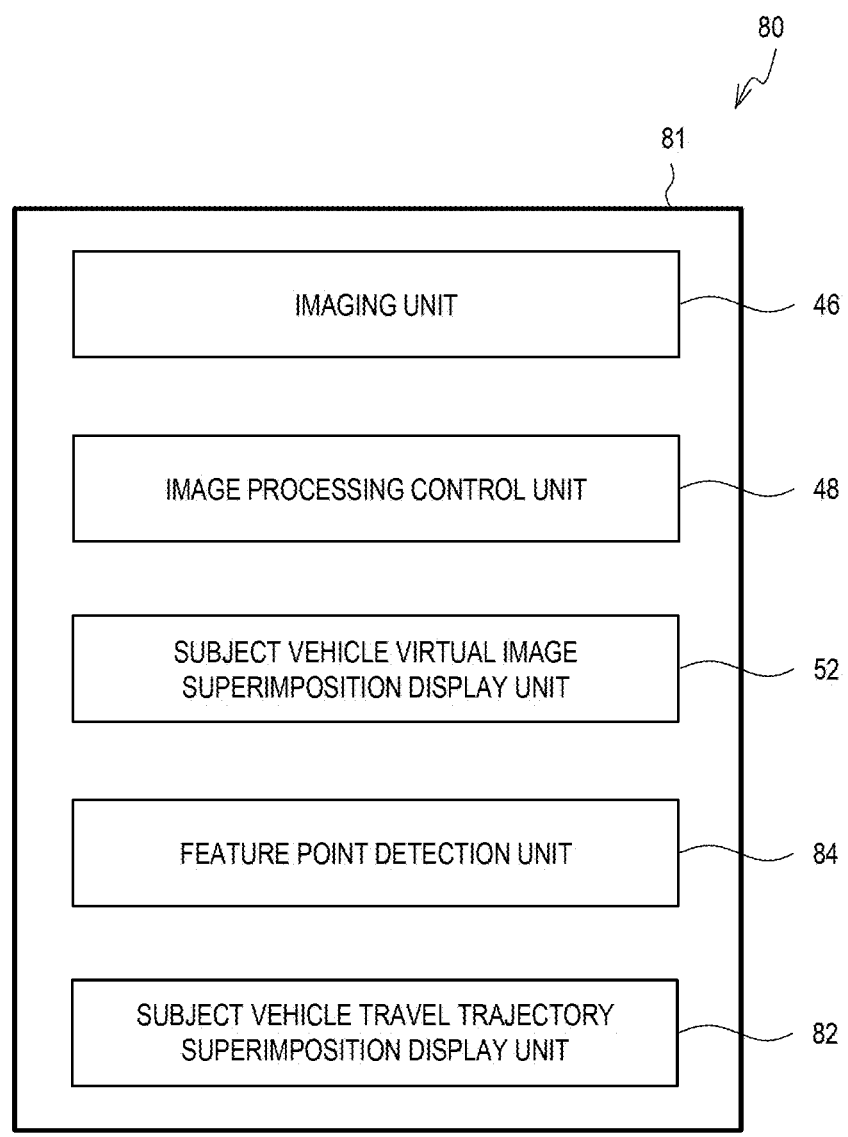
FIG. 13 is a block diagram showing a functional configuration of the electronic mirror system for the vehicle according to the second embodiment.

FIG. 13 is a block diagram showing a functional configuration of the electronic mirror system for the vehicle 80.

As shown in FIG. 13, the electronic mirror system for the vehicle 80 has, as a functional configuration, the imaging unit 46, the image processing control unit 48, the subject vehicle virtual image superimposition display unit 52, a feature point detection unit 84 and a subject vehicle travel trajectory superimposition display unit 82. Each functional configuration is implemented by the CPU 30 of the display control device 20 reading and executing the image display program stored in the ROM 32 or the storage 36 (see FIG. 7).

Figure 9:
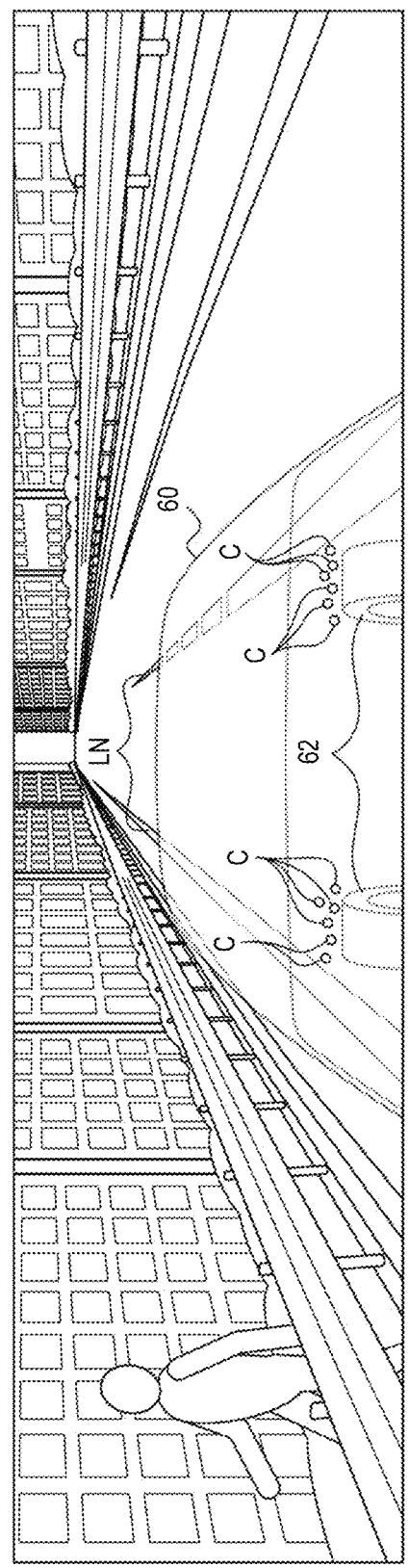
FIG. 9 is a schematic diagram schematically showing an initial stage of image processing of an electronic mirror system for a vehicle according to a second embodiment.
Figure 10:
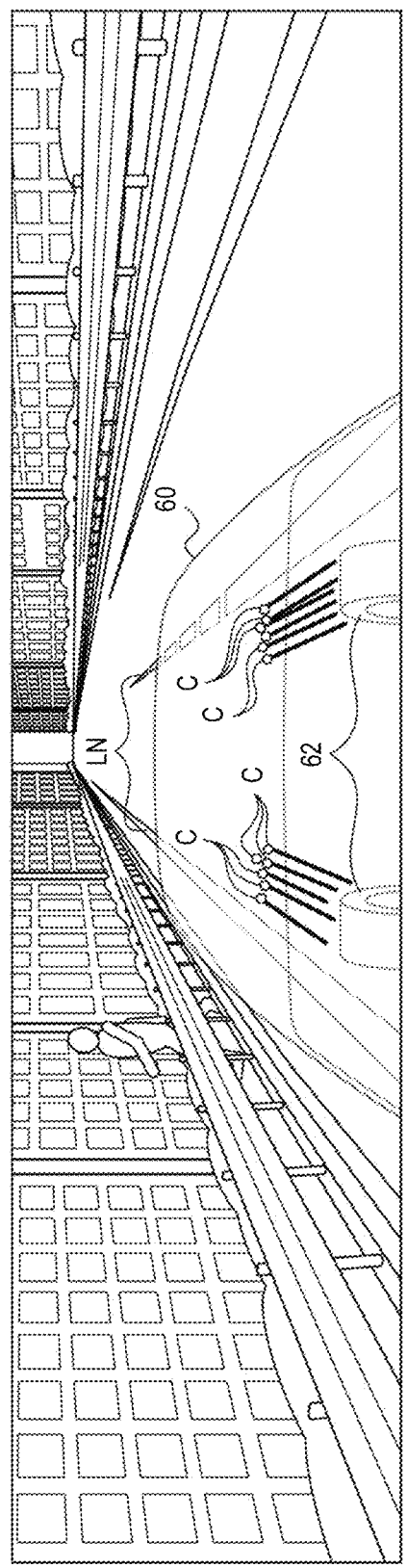
FIG. 10 is a schematic diagram schematically showing a middle stage of the image processing of the electronic mirror system for the vehicle according to the second embodiment.
Figure 11:
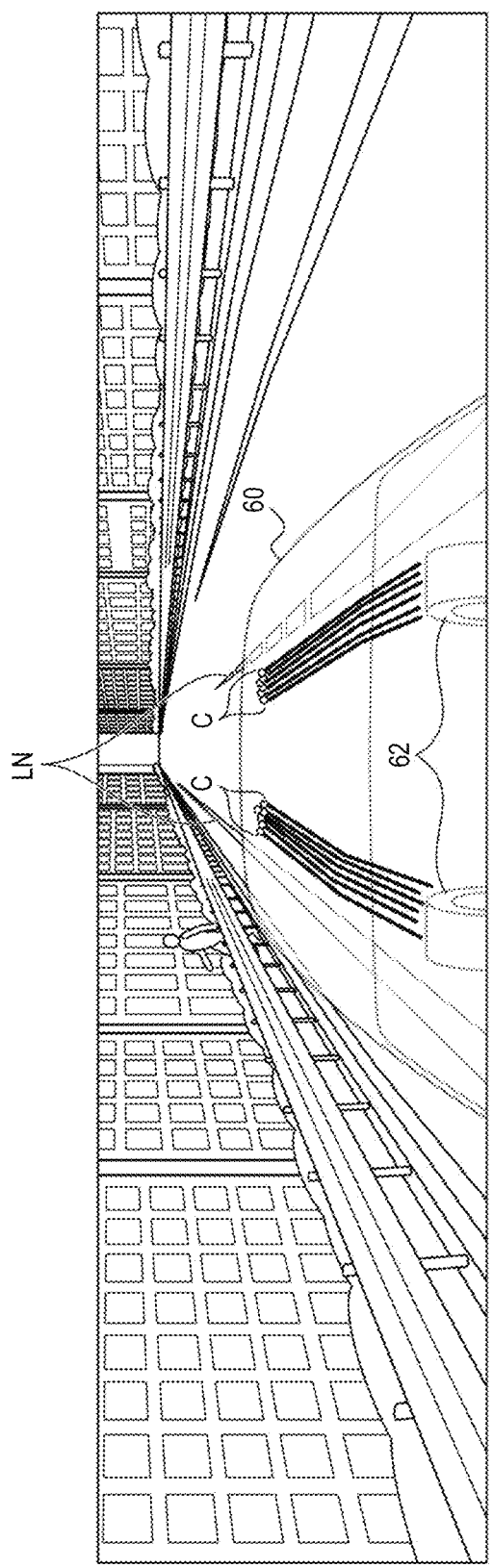
FIG. 11 is a schematic diagram schematically showing a final stage of the image processing of the electronic mirror system for the vehicle according to the second embodiment.
Figure 12:
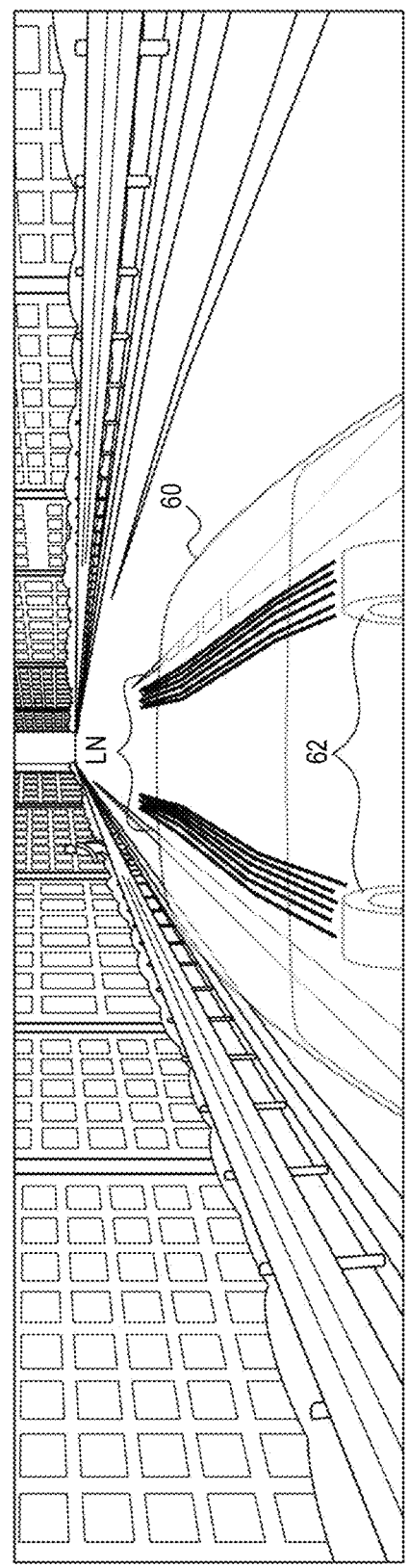
FIG. 12 is a schematic diagram schematically showing a stage before displaying a virtual image of travel trajectory in the image processing of the electronic mirror system for the vehicle according to the second embodiment.

The feature point detection unit 84 extracts a feature point C by performing the image analysis on at least one of the rear image, the rear lateral images and the composite image in a range that is within the vicinity of the rear of the vehicle at the positions (the same position as the virtual point VP as shown in FIG. 4, according to one example in the present embodiment) corresponding to the left and right rear wheels 62 in at least one of the rear image, the rear lateral images and the composite image, as shown in FIG. 9. The feature point C may be a position, for example, at which luminance largely changes. Then, the feature point detection unit 84 detects a moving destination of the extracted feature point C in the next frame of the composite image. By repeating this processing, a movement trajectory from an original coordinate position of the feature point C on the composite image to a position of the feature points several frames later is calculated as shown in FIGS. 10 to 12. Further, when the feature point C is extracted from the rear image and the rear lateral images, the coordinate conversion of the feature point C is carried out such that the position of the feature point C is recognized as the same point on the composite image.

In a case where the feature point C cannot be extracted from the range within the vicinity of the rear of the vehicle at the positions corresponding to the left and right rear wheels 62 in at least one of the rear image, the rear lateral images and the composite image, the feature point detection unit 84 expands the range from which the feature point C is extracted in the composite image until the feature point C is extracted.

The subject vehicle travel trajectory superimposition display unit 82 generates the first virtual image of travel trajectory 64 showing the travel trajectory of the vehicle, which respectively extend from the left and right rear wheels 62 of the virtual image of the subject vehicle 60 toward the rear of the vehicle 12 on the composite image, so as to display the first virtual image of travel trajectory 64 superimposed on the composite image (see FIG. 3). When the first virtual image of travel trajectory 64 is generated the subject vehicle travel trajectory superimposition display unit 82 generates the first virtual image of travel trajectory 64 so as to include the movement trajectory of the feature point C (see FIG. 12) calculated by the feature point detection unit 84. Consequently, the first virtual image of travel trajectory 64 generated by the subject vehicle travel trajectory superimposition display unit 82 is along the actual travel trajectory of the subject vehicle 12. Further, the subject vehicle travel trajectory superimposition display unit 82, as in the first embodiment, displays the first virtual image of travel trajectory 64 within the trajectory display range in the composite image, and changes a length of the first virtual image of travel trajectory 64 in the extending direction so as to correspond to the display range in the extending direction of the lane boundary line LN in the composite image, depending on the situation.

Operation and Effect of Second Embodiment

The operation and effect of the second embodiment will be described hereinbelow.

As with the configuration described above, the same effect as the first embodiment can be obtained since the electronic mirror system for the vehicle of the second embodiment is similar to the electronic mirror system for the vehicle 10 of the first embodiment except in that the display control device 81 generates the first virtual image of travel trajectory 64 by extracting the feature point C from the range within the vicinity of the rear of the vehicle. The display control device 81 generates the first virtual image of travel trajectory 64 based on the movement trajectory of the feature point C extracted from the range within the vicinity of the rear of the vehicle at the positions corresponding to the left and right rear wheels 62 in at least one of the rear image, the rear lateral images and the composite image, as shown in FIGS. 9 to 12, thus it is possible to display the trajectory along the actual travel trajectory. Therefore, it is possible to display the first virtual image of travel trajectory 64 superimposed on the composite image even in a case where the lane boundary line LN line cannot be detected. Consequently, it is possible to easily grasp the relative position on the road of the subject vehicle 12 in the lateral direction even in a case where it is difficult to detect the lane boundary line LN.

Further, the display control device 81 expands the range from which the feature point C is extracted in a case where the feature point C cannot be extracted from the range within the vicinity of the rear of the vehicle at the positions corresponding to the left and right rear wheels 62 in at least one of the rear image, the rear lateral images and the composite image, thus it is possible to generate the first virtual image of travel trajectory 64 even when it is difficult to extract the feature point C. Consequently, it is possible to display the first virtual image of travel trajectory 64 superimposed on the composite image under various situations.

In the present embodiment, the first virtual image of travel trajectory 64 is generated by extracting the feature point C from the range of the left and right rear wheels 62 within the vicinity of the rear in at least one of the rear image, the rear lateral images and the composite image, but the present disclosure is not limited thereto. In a case where the lane boundary line LN in the composite image can be detected, the first virtual image of travel trajectory 64 may be generated by calculating the distance from the positions corresponding to the left and right rear wheels 62 to the lane boundary line LN, such that the first virtual image of travel trajectory 64 is generated along the lane boundary line LN and apart from the lane boundary line LN by the calculated distance with the positions corresponding to the left and right rear wheels 62 as the starting points, the same as in the first embodiment.

Third Embodiment

Figure 14:
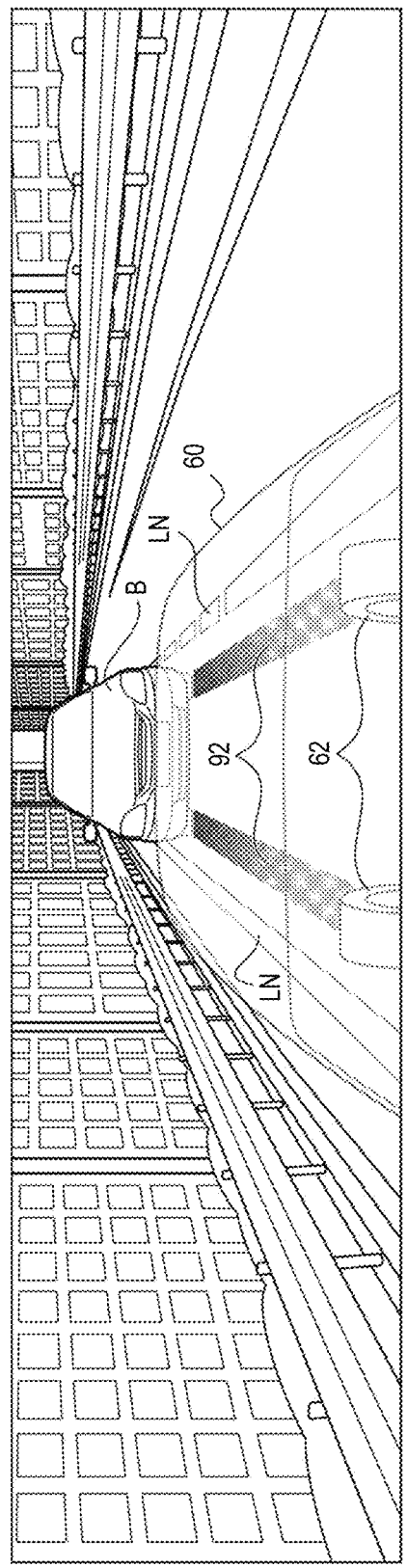
FIG. 14 is a schematic diagram showing an exemplified display of the composite image of an electronic mirror system for a vehicle according to a third embodiment.

An electronic mirror system for a vehicle according to a third embodiment of the present disclosure will be described hereinbelow with reference to FIGS. 14 and 15. The same components as those in the first embodiment described above are denoted by the same reference signs and the description thereof will be omitted.

An electronic mirror system for a vehicle 90 according to the third embodiment has the same basic configuration as that of the first embodiment, except in that a length of a second virtual image of travel trajectory 92 in the extending direction is changed such that the second virtual image of travel trajectory 92 does not overlap with a vehicle B behind the vehicle in the composite image.

That is, the electronic mirror system for the vehicle 90 includes the rear camera 16 (see FIG. 2), the outer camera unit 14, the electronic inner mirror 18, and the display control device 91 (see FIG. 1). The electronic mirror system for the vehicle 90 implements various functions using the hardware resources described above. A functional configuration implemented by the electronic mirror system for the vehicle 90 will be described.

Figure 15:
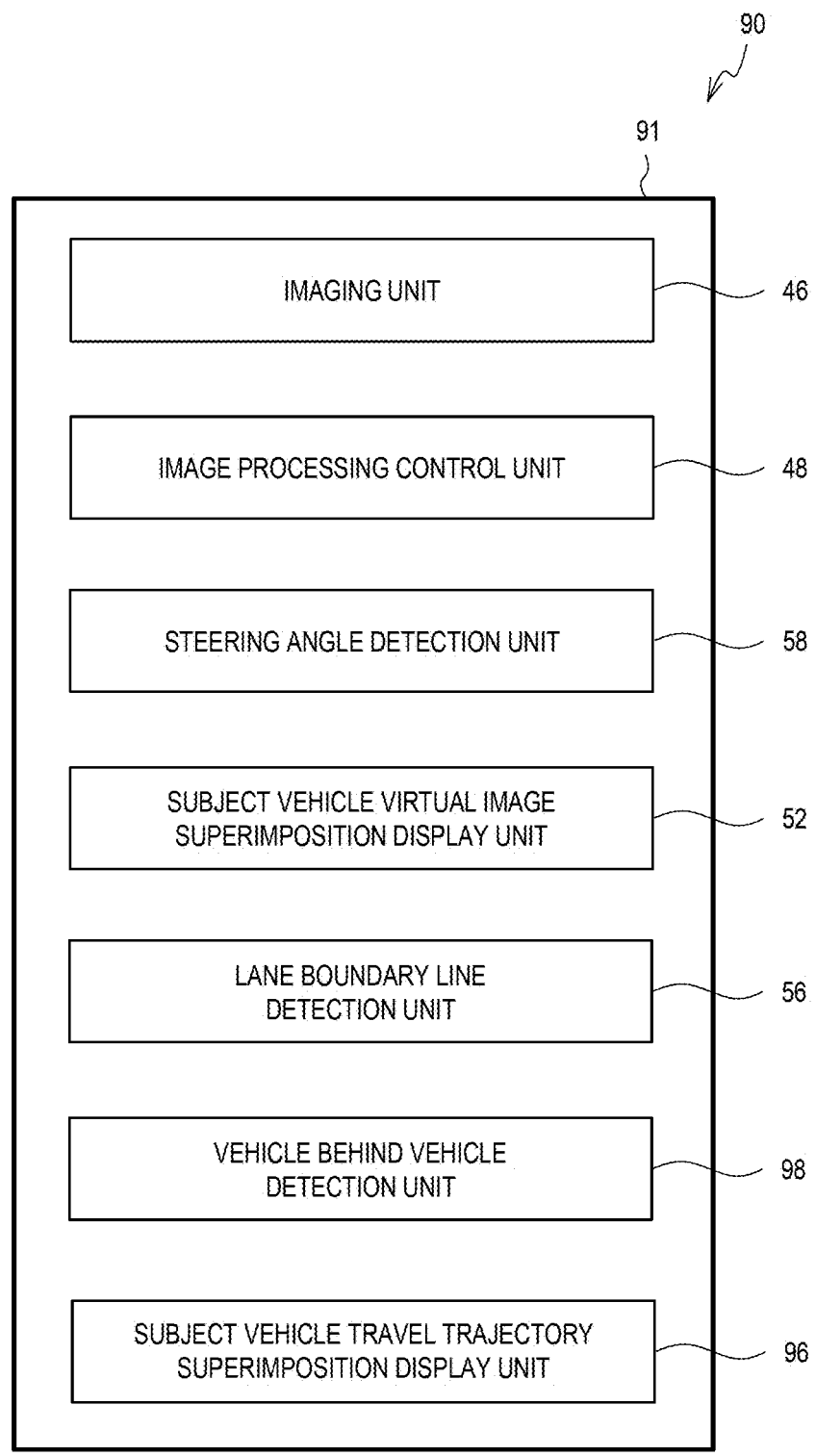
FIG. 15 is a block diagram showing a functional configuration of the electronic mirror system for the vehicle according to the third embodiment.

FIG. 15 is a block diagram showing a functional configuration of the electronic mirror system for the vehicle 90.

As shown in FIG. 15, the electronic mirror system for the vehicle 90 has, as a functional configuration, the imaging unit 46, the image processing control unit 48, the virtual image of the subject vehicle virtual image superimposition display unit 52, the lane boundary line detection unit 56, the steering angle detection unit 58, a subject vehicle travel trajectory superimposition display unit 96, and a vehicle behind the vehicle detection unit 98. Each functional configuration is implemented by the CPU 30 of a display control device 91 reading and executing the image display program stored in the ROM 32 or the storage 36 (see FIG. 7).

The vehicle behind the vehicle detection unit 98 detects, by performing image recognition on the composite image, the vehicle B behind the vehicle (see FIG. 14) located on the rear of the subject vehicle 12 in the composite image, and a distance from the subject vehicle 12 to the vehicle B behind the vehicle. The vehicle B behind the vehicle detected by the vehicle behind the vehicle detection unit 98 is not limited to a four-wheeled vehicle, but includes objects generally narrower than the four-wheeled vehicle, such as a two-wheeled vehicle, a bicycle and a pedestrian (hereinafter, simply referred to as a "narrow object"). When the narrow object is detected, the vehicle behind the vehicle detection unit 98 also detects to which of the left and right rear wheels 62 the narrow object is closer to.

Further, the subject vehicle travel trajectory superimposition display unit 96 generates a first virtual image of travel trajectory 64 virtually showing travel trajectory of the vehicle, which respectively extend from the left and right rear wheels 62 of the virtual image of the subject vehicle 60 toward the rear of the vehicle 12 in the composite image, so as to display the first virtual image of travel trajectory 64 superimposed on the composite image (see FIG. 3). Further, in a case where the vehicle B behind the vehicle detected by the vehicle behind the vehicle detection unit 98 overlaps with the first virtual image of travel trajectory 64, the subject vehicle travel trajectory superimposition display unit 96 generates the second virtual image of travel trajectory 92 by changing a length of the first virtual image of travel trajectory 64 in the extending direction (rearward of the vehicle on the composite image) such that the first virtual image of travel trajectory 64 does not overlap with the vehicle B behind the vehicle (see FIG. 14). Additionally, in a case where the narrow object is detected rearward of the subject vehicle 12 and the narrow object is closer to any one of the left and right rear wheels 62, the subject vehicle travel trajectory superimposition display unit 96 changes the length of the first virtual image of travel trajectory 64 only in the extending direction, which is extended from the rear wheels 62 to which the narrow object is closer, to the length of the second virtual image of travel trajectory 92 so as not to overlap with the narrow object.

Further, the subject vehicle travel trajectory superimposition display unit 96 changes the display of the second virtual image of travel trajectory 92 in a case where the distance from the vehicle B behind the vehicle detected by the vehicle behind the vehicle detection unit 98 to the subject vehicle 12 is equal to or less than a predetermined threshold. In the present embodiment, when the distance from the vehicle B behind the vehicle to the subject vehicle 12 is short, the color of the second virtual image of travel trajectory 92 is changed to red. In addition to changing the color, the second virtual image of travel trajectory 92 may be caused to blink or changed to another display.

Operation and Effect of Third Embodiment

The operation and effect of the third embodiment will be described hereinbelow.

As with the configuration described above, the same effect as the first embodiment can be obtained since it is similar to the electronic mirror system for the vehicle 10 of the first embodiment except in that the length of the second virtual image of travel trajectory 92 in the extending direction is changed such that the second virtual image of travel trajectory 92 does not overlap with the vehicle B behind the vehicle in the composite image. Further, the display control device 91 changes the length of the second virtual image of travel trajectory 92 in the extending direction such that the second virtual image of travel trajectory 92 does not overlap with the vehicle B behind the vehicle shown in the composite image, thus it is possible to reduce a feeling of discomfort that the driver may feel while visually recognizing the composite image when the second virtual image of travel trajectory 92 is superimposed on the vehicle B behind the vehicle. As such, visibility can be improved.

Moreover, the subject vehicle travel trajectory superimposition display unit 96 changes the display of the second virtual image of travel trajectory 92 in a case where the distance from the subject vehicle 12 to the vehicle B behind the vehicle shown in the composite image is equal to or less than the predetermined distance, thus it is possible to easily grasp the distance perception between the subject vehicle 12 and the vehicle B behind the vehicle when visually recognizing the composite image. As such, the positional relationship between the subject vehicle 12 and the vehicle B behind the vehicle can be easily grasped.

In the present embodiment, the first virtual image of travel trajectory 64 is generated by calculating the distance from the positions corresponding to the left and right rear wheels 62 to the lane boundary line LN, such that the first virtual image of travel trajectory 64 is generated along the lane boundary line LN and apart from the lane boundary line LN at the calculated distance with the positions corresponding to the left and right rear wheels 62 as the starting points, the same as in the first embodiment, but the present disclosure is not limited thereto. The first virtual image of travel trajectory 64 may be generated by extracting the feature point C from the range of the left and right rear wheels 62 in the vicinity of the rear in the composite image, or generated by combining those two algorithms.

Although the embodiments of the present disclosure have been described above, the present disclosure is not limited thereto, and various modifications and alterations may be made without departing from the scope thereof.

What is claimed is:

1. An electronic mirror system for a vehicle, comprising:
   a rear imaging unit configured to capture an image of a rear of a vehicle;
   a pair of left and right rear lateral imaging units respectively configured to capture images of the rear on left and right sides of the vehicle; and
   an image processing unit including:
      a subject vehicle virtual image superimposition display unit configured to display, on a display unit, a composite image, composited by performing image processing on a rear image captured by the rear imaging unit and rear lateral images captured by the rear lateral imaging units such that the rear image and the rear lateral images become a continuous image, and configured to generate a virtual image of a subject vehicle virtually showing the vehicle, and to display the virtual image of the subject vehicle superimposed on the composite image, the virtual image of the subject vehicle including a pair of left and right rear wheels of the vehicle; and
      a subject vehicle travel trajectory superimposition display unit configured to generate a virtual image of travel trajectory virtually showing a travel trajectory of the vehicle and to display the virtual image of travel trajectory superimposed on the composite image, the travel trajectory extending from the left and right rear wheels toward the rear of the vehicle in the composite image,
   wherein a relative position of the subject vehicle on the road in a lateral direction is displayed on the display unit from a position of the virtual image of the travel trajectory with respect to the road shown in the composite image.

2. The electronic mirror system according to claim 1, wherein:
   the image processing unit is configured to detect a lane boundary line appearing in at least one of the rear image, the rear lateral images, and the composite image; and
   the subject vehicle travel trajectory superimposition display unit is configured to calculate a distance from positions corresponding to the left and right rear wheels in the composite image to the lane boundary line appearing in at least one of the rear image, the rear lateral images, and the composite image, and configured to generate the virtual image of travel trajectory along the lane boundary line and apart from the lane boundary line by the calculated distance.

3. The electronic mirror system according to claim 2, wherein the subject vehicle travel trajectory superimposition display unit is configured to generate the virtual image of travel trajectory such that a display range of the virtual image of travel trajectory in an extending direction in the composite image is the same as a display range of the lane boundary line in the extending direction in the composite image.

4. The electronic mirror system according to claim 2, wherein:
   the image processing unit is configured to acquire steering angle information of a steering wheel of the vehicle; and
   the subject vehicle virtual image superimposition display unit is configured to curve, according to the steering angle information, the virtual image of travel trajectory about the positions corresponding to the left and right rear wheels in the composite image in a width direction of the vehicle.

5. The electronic mirror system according to claim 1, wherein:
   the image processing unit is configured to extract a feature point from a range in a vicinity of the rear of the vehicle at positions corresponding to the left and right rear wheels in at least one of the rear image, the rear lateral images, and the composite image; and the subject vehicle travel trajectory superimposition display unit is configured to generate the virtual image of travel trajectory based on a movement trajectory of the feature point.

6. The electronic mirror system according to claim 5, wherein the image processing unit is configured to expand a range from which the feature point is extracted in the composite image in a case where the feature point is not extractable from the range in the vicinity of the rear of the vehicle at the positions corresponding to the left and right rear wheels in at least one of the rear image, the rear lateral images, and the composite image.

7. The electronic mirror system according to claim 1, wherein the subject vehicle travel trajectory superimposition display unit is configured to change, in a case where the composite image shows a vehicle behind the vehicle, a length of the virtual image of travel trajectory in the extending direction such that the virtual image of travel trajectory does not overlap with the vehicle behind vehicle.

8. The electronic mirror system according to claim 1, wherein the subject vehicle travel trajectory superimposition display unit is configured to change a display of the virtual image of travel trajectory in a case where the composite image shows a vehicle behind the vehicle and a distance from the vehicle to the vehicle behind the vehicle is equal to or less than a predetermined distance.

* * * * *